(12) United States Patent
Nicoleau et al.

(10) Patent No.: US 9,102,568 B2
(45) Date of Patent: *Aug. 11, 2015

(54) SPRAYABLE HYDRAULIC BINDER COMPOSITION AND METHOD OF USE

(75) Inventors: Luc Nicoleau, Altenmarkt an der Alz (DE); Montserrat Alfonso, Wettswil am Ablis (CH); Elena Kolomiets, Brugg (CH)

(73) Assignee: Construction Research & Technology GmbH, Trostberg (DE)

( * ) Notice: Subject to any disclaimer, the term of this patent is extended or adjusted under 35 U.S.C. 154(b) by 321 days.

This patent is subject to a terminal disclaimer.

(21) Appl. No.: 13/390,833

(22) PCT Filed: Aug. 31, 2010

(86) PCT No.: PCT/EP2010/062671
§ 371 (c)(1),
(2), (4) Date: Apr. 5, 2012

(87) PCT Pub. No.: WO2011/026825
PCT Pub. Date: Mar. 10, 2011

(65) Prior Publication Data
US 2012/0196046 A1   Aug. 2, 2012

(30) Foreign Application Priority Data

Sep. 2, 2009   (EP) .................................. 09169299

(51) Int. Cl.
| | | |
|---|---|---|
| C04B 28/04 | (2006.01) | |
| C04B 28/02 | (2006.01) | |
| C04B 28/08 | (2006.01) | |

(Continued)

(52) U.S. Cl.
CPC ............. *C04B 28/04* (2013.01); *C04B 22/0086* (2013.01); *C04B 28/02* (2013.01); *C04B 28/021* (2013.01); *C04B 28/08* (2013.01); *C04B 28/10* (2013.01); *C04B 28/12* (2013.01); *C04B 28/14* (2013.01); *C04B 28/188* (2013.01); *C04B 41/4543* (2013.01); *C04B 41/5076* (2013.01); *C04B 2111/00155* (2013.01)

(58) Field of Classification Search
USPC ......................................................... 427/427
See application file for complete search history.

(56) References Cited

U.S. PATENT DOCUMENTS 5,158,996 A * 10/1992 Valenti .............................. 524/5
5,332,041 A    7/1994 Onan et al.
(Continued)

FOREIGN PATENT DOCUMENTS

| CA | 2071051 A1 | 12/1992 |
|---|---|---|
| CA | 2172004 A1 | 9/1996 |

(Continued)

OTHER PUBLICATIONS

PCT/EP2010/062671—International Search Report, Mar. 11, 2011.
(Continued)

*Primary Examiner* — Nathan T Leong
(74) *Attorney, Agent, or Firm* — Curatolo Sidoti Co., LPA; Joseph G. Curatolo; Salvatore A. Sidoti

(57) ABSTRACT

Process for the preparation of a sprayable hydraulic binder composition containing as main components water, aggregates, hydraulic binder, set accelerator, characterized in, that a calcium silicate hydrate (C—S—H) containing component is added before and/or at the spray nozzle.

15 Claims, 6 Drawing Sheets

(51) Int. Cl.

| | |
|---|---|
| C04B 28/10 | (2006.01) |
| C04B 28/12 | (2006.01) |
| C04B 28/14 | (2006.01) |
| C04B 28/18 | (2006.01) |
| C04B 41/45 | (2006.01) |
| C04B 41/50 | (2006.01) |
| C04B 22/00 | (2006.01) |
| C04B 111/00 | (2006.01) |

(56) References Cited

U.S. PATENT DOCUMENTS

| | | | |
|---|---|---|---|
| 5,340,385 | A | 8/1994 | Arfaei et al. |
| 5,355,954 | A | 10/1994 | Onan et al. |
| 5,360,841 | A | 11/1994 | Knop et al. |
| 5,413,634 | A | 5/1995 | Shawl et al. |
| 5,609,680 | A | 3/1997 | Kobayashi et al. |
| 5,709,743 | A * | 1/1998 | Leture et al. ............ 106/713 |
| 5,879,445 | A | 3/1999 | Guicquero et al. |
| 5,925,184 | A | 7/1999 | Hirata et al. |
| 6,133,347 | A | 10/2000 | Vickers, Jr. et al. |
| 6,170,574 | B1 | 1/2001 | Jones |
| 6,451,881 | B1 | 9/2002 | Vickers, Jr. et al. |
| 6,492,461 | B1 | 12/2002 | Vickers, Jr. et al. |
| 6,832,652 | B1 | 12/2004 | Dillenbeck et al. |
| 6,861,459 | B2 | 3/2005 | Porsch et al. |
| 6,908,955 | B2 | 6/2005 | Porsch et al. |
| 7,041,167 | B2 | 5/2006 | Jiang |
| 7,258,736 | B2 | 8/2007 | Oriakhi et al. |
| 7,605,196 | B2 | 10/2009 | Schinabeck et al. |
| 7,641,731 | B2 | 1/2010 | Chanut et al. |
| 7,772,300 | B2 | 8/2010 | Schinabeck et al. |
| 8,349,960 | B2 | 1/2013 | Gaeberlein et al. |
| 8,436,072 | B2 | 5/2013 | Herth et al. |
| 2002/0129743 | A1 | 9/2002 | Frailey et al. |
| 2002/0166479 | A1 | 11/2002 | Jiang |
| 2003/0181579 | A1 | 9/2003 | Porsch et al. |
| 2004/0261664 | A1 | 12/2004 | Oriakhi et al. |
| 2007/0032550 | A1 | 2/2007 | Lewis et al. |
| 2007/0163470 | A1 | 7/2007 | Chanut et al. |
| 2008/0108732 | A1 | 5/2008 | Wieland et al. |
| 2008/0190614 | A1 | 8/2008 | Ballard |
| 2008/0200590 | A1 | 8/2008 | Schinabeck et al. |
| 2008/0319217 | A1 | 12/2008 | Ingrisch et al. |
| 2009/0054558 | A1 | 2/2009 | Wieland et al. |
| 2009/0186964 | A1 | 7/2009 | Schinabeck et al. |
| 2009/0277357 | A1 * | 11/2009 | Parker et al. ............ 106/734 |
| 2010/0003412 | A1 * | 1/2010 | Weibel ............ 427/337 |
| 2010/0071595 | A1 * | 3/2010 | Lindlar et al. ............ 106/640 |
| 2010/0190888 | A1 | 7/2010 | Gaeberlein et al. |
| 2011/0015301 | A1 | 1/2011 | Herth et al. |
| 2011/0017100 | A1 | 1/2011 | Lindlar et al. |
| 2011/0160393 | A1 | 6/2011 | Sakamoto et al. |
| 2011/0203486 | A1 | 8/2011 | Nicoleau et al. |
| 2011/0269875 | A1 | 11/2011 | Nicoleau et al. |
| 2011/0281975 | A1 | 11/2011 | Kraus et al. |
| 2012/0216724 | A1 | 8/2012 | Nicoleau et al. |
| 2012/0220696 | A1 | 8/2012 | Nicoleau et al. |
| 2012/0270969 | A1 | 10/2012 | Bichler et al. |
| 2012/0270970 | A1 | 10/2012 | Bichler et al. |
| 2013/0118381 | A1 | 5/2013 | Frenkenberger et al. |
| 2014/0066546 | A1 | 3/2014 | Langlotz et al. |

FOREIGN PATENT DOCUMENTS

| | | |
|---|---|---|
| DE | 35 27 981 A1 | 2/1987 |
| DE | 43 42 407 A1 | 6/1995 |
| DE | 44 11 797 A1 | 10/1995 |
| DE | 197 24 700 A1 | 12/1998 |
| DE | 10 2004 050 395 A1 | 4/2006 |
| DE | 10 2005 001 101 A1 | 7/2006 |
| DE | 20 2006 016 797 U1 | 12/2006 |
| DE | 10 2005 051 375 A1 | 5/2007 |
| DE | 10 2007 027 470 A1 | 12/2008 |
| EP | 0 403 974 A1 | 12/1990 |
| EP | 0 518 156 A2 | 12/1992 |
| EP | 0 605 257 A1 | 12/1993 |
| EP | 0 637 574 A1 | 2/1995 |
| EP | 0 812 812 A1 | 12/1997 |
| EP | 1 138 697 A1 | 10/2001 |
| EP | 1 491 516 A2 | 12/2004 |
| EP | 1 655 272 A1 | 5/2006 |
| EP | 1 878 713 A1 | 1/2008 |
| EP | 1 964 825 A1 | 9/2008 |
| EP | 0 817 0692.1 | 6/2010 |
| EP | 2 325 231 A1 | 5/2011 |
| JP | 2000-095554 A | 4/2000 |
| JP | 2001-058863 A | 3/2001 |
| JP | 2008-127247 A | 6/2008 |
| WO | WO 94/08913 A1 | 4/1994 |
| WO | WO 00/44487 A1 | 8/2000 |
| WO | WO 01/04185 A1 | 1/2001 |
| WO | WO 02/070425 A1 | 9/2002 |
| WO | WO 2005/075381 A1 | 8/2005 |
| WO | WO 2005/077857 A2 | 8/2005 |
| WO | WO 2005/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2007/125311 A1 | 11/2007 |
| WO | WO2008006410 * | 1/2008 |
| WO | WO 2008/145975 A1 | 12/2008 |
| WO | WO 2010/026155 A1 | 3/2010 |
| WO | WO 2010/040611 A1 | 4/2010 |
| WO | WO 2010/063777 A1 | 6/2010 |
| WO | WO 2011/006837 A1 | 1/2011 |
| WO | WO 2011/026720 A1 | 3/2011 |
| WO | WO 2011/026825 A2 | 3/2011 |
| WO | WO 2011/110509 A1 | 9/2011 |
| WO | WO 2012/072466 A1 | 6/2012 |

OTHER PUBLICATIONS

"Silica"; Ullmann's Encyclopedia of Industrial Chemistry; 2002; Wiley-VCH Verlag GmbH & Co. KGaA; Abstract.

Cölfen, Helmut; "Analytical Ultracentrifugation of NanoParticles"; Polymer News; 2004; vol. 29; p. 101; Taylor & Francis; Abstract.

Saito, Fumio, et al.; "Mechanochemical Synthesis of Hydrated Calcium Silicates by Room Temperature Grinding"; Solid State Ionics; 1997; pp. 37-43; Elsevier.

PCT/EP2010/062671, International Written Opinion, mailed on Mar. 11, 2011.

PCT/EP2010/062671, International Preliminary Report on Patentability, mailed on Mar. 6, 2012.

* cited by examiner

SPRAYABLE HYDRAULIC BINDER COMPOSITION AND METHOD OF USE

CROSS REFERENCE TO RELATED APPLICATIONS

This application is a national stage application of International Application No. PCT/EP2010/062671, filed 31 Aug. 2010, which claims priority from European Patent Application Serial No. 09169299.6, filed 2 Sep. 2009, from which applications priority is claimed, and which are incorporated herein by reference.

The present invention relates to a process for the preparation of a sprayable hydraulic binder composition, the sprayable hydraulic binder composition and a method of the use of the composition.

BACKGROUND OF THE INVENTION

The application of cementitious compositions such as concrete to a substrate by spraying from a nozzle is a well-established technology, and is widely used in such applications as the lining of tunnels. It is a requirement that such compositions are able to be easily conveyed (usually by pumping) to a spray nozzle. This can be achieved by the addition to the cementitious composition that is to be pumped and sprayed, at the mix stage, of an admixture which confers improved fluidity of the mix. There is a considerable variety of such admixtures known to and used by the art, for example, sulfonate melamine formaldehyde condensate, sulfonate naphthalene formaldehyde condensate, or acrylic polymer families.

Sprayed concrete or "shotcrete" is mainly used in underground construction. Its application consists in the conveying of a mortar or concrete to a nozzle, where a set accelerating admixture and air are added, and it's pneumatically projection at high velocity onto a substrate. Indeed, fast setting and early strength development are needed to allow concrete adhesion on the wall without falls and hence earlier entrance and further excavation are ensured, guarantying security and efficient construction. For this reason, accelerators which ensure rapid development of the mechanical properties are added to the sprayed concrete or sprayed mortar.

It is known that set accelerators influence the hydration process of clinker phases such as C3A and C3S, the consumption of the sulfate carriers and the chemical composition of pore solution at the very beginning stage. The quicker setting caused by adding set accelerators is due to large formation of hydration product like ettringite, resulting in some cases with a poor early strength development which is in the literature correlated to a slow calcium silicate hydrates (C—S—H) formation.

By adding (1) a hardening accelerator consisting in calcium silicate hydrates and (2) a set accelerator the calcium silicate hydrate (C—S—H) precipitation can be strongly accelerated allowing faster development of the mechanical properties.

A process for the preparation of a liquid accelerator is described in EP 08170692.1, wherein the liquid accelerator containing aluminum sulfate and/or aluminum hydroxy sulfate. EP1878713 describes an accelerating admixture that is based on 25 to 40% by weight of aluminum sulfate, at least one further aluminum compound, so that the molar ratio of aluminum to sulfate in the dispersion is 1.35 to 0.70 and an inorganic stabilizer, which comprises a magnesium silicate. A process of applying a layer of cementitious composition on a substrate by spraying the cementitious composition is described in EP 0812812. An accelerating admixture and hardening accelerator for hydraulic binder according to EP 1964825 comprises sulfate, aluminum, organic acid and/or mineral acid and silicic acid. WO 2005/075381 describes a water-based accelerating admixture and a hardening accelerator for hydraulic binder, comprising sulfate, aluminum and organic acid, wherein the molar ratio of aluminum to organic acid is less than 0.65.

Conventional setting accelerators for shotcrete and other cement-containing materials are distinguished in that they either result in rapid setting and relatively low early strength or lead to slow setting in combination with relatively high early strength. Furthermore, the results with respect to the set accelerator performance in concrete vary often depending on the cement type, concrete mix design, and temperature. Even though all these factors are taken into account before application, it is difficult to achieve the high early strength development that nowadays are required for an increasing number of tunneling projects with known set accelerators. Therefore, the demand for more efficient and highly robust accelerator admixtures, which are suitable for a wide variety of cements on a world-wide basis and comply with miscellaneous specification, is high.

Furthermore, admixtures for building material mixtures comprising hydraulic binders typically also contain hardening accelerators which increase the early strength development rate of the hydraulic binder.

According to WO 02/070425, calcium silicate hydrates, can be used as such a hardening accelerator. However, commercially available calcium silicate hydrates and dispersions thereof may be regarded only as hardening accelerators which have little effect.

The object of the invention is to provide a sprayable hydraulic binder composition as e.g. sprayed concrete or sprayed mortar for the coating of substrates, in particular tunnel surfaces, mine surfaces, construction trenches and shafts, with concrete or mortar.

Surprisingly it has been found a new chemical system to accelerate setting and early strength development in hydraulic binder compositions, in particular in sprayed concrete or sprayed mortar.

DETAILED DESCRIPTION OF THE INVENTION

The disadvantage of known set accelerating admixtures is that the provided fast setting results very often in a slow early strength development in hydraulic binder containing compositions such as sprayed concrete.

It is an object of the present invention to provide a process for the preparation of a sprayable hydraulic binder composition containing as main components water, aggregates, hydraulic binder and a set accelerator, characterized in, that a calcium silicate hydrate (C—S—H) containing component is added before and/or at the spray nozzle.

Surprisingly it has been found that calcium silicate hydrates improve the performance of set accelerators in hydraulic binder compositions and thereby create a higher hardening of the hydraulic binder.

The invention therefore provides a new chemical system to accelerate setting and early strength development in hydraulic binder compositions, in particular in sprayed concrete. It has now been found that a specific chemical system may be prepared by the combination of (1) a hardening admixture and (2) a set accelerator. The (1) hardening admixture contains calcium silicate hydrates. The (2) set accelerator consists of any type of alkali-free or alkali-containing set accelerator for sprayed concrete on the basis of e.g. aluminium sulfate or sodium silicate. The hardening accelerator can be as well added simultaneously with the set accelerator at the nozzle.

Especially when sprayed on a substrate, a cementitious composition, such as concrete, must set very quickly. For such a use, powerful accelerators including sodium aluminate and alkali metal hydroxide have been used. However, since these accelerators are highly alkaline, its use resulted in very unpleasant handling and working conditions. Therefore, low alkali and alkali-free accelerators have been proposed containing aluminum compounds.

Usual alkali-free setting accelerators for sprayed concrete and other cement-containing materials are distinguished in that either they result in rapid setting and relatively low early strength or lead to slow setting in combination with relatively high early strength.

In principle, the hardening accelerator contains inorganic and organic component. The inorganic component may be regarded as a modified, finely dispersed calcium silicate hydrate (C—S—H) which may contain foreign ions, such as magnesium and aluminum. The calcium silicate hydrate (C—S—H) according to a preferred method is prepared by reaction of a water-soluble calcium compound with a water-soluble silicate compound, the reaction of the water-soluble calcium compound with the water-soluble silicate compound being preferably carried out in the presence of an aqueous solution which contains a water-soluble comb polymer suitable as a plasticizer for hydraulic binders and/or preferably carried out in the presence of polycondensates containing (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt are present in the aqueous solution which contains a water-soluble comb polymer suitable as a plasticizer for hydraulic binders.

Preferably the aqueous solution in which the reaction is carried out contains besides the comb polymer a second polymer. The second polymer is a polycondensate as described in the following text of this embodiment and following embodiments. Preferably the comb polymer used together with the polycondensate is obtainable by a radical polymerization.

The polycondensates according to this embodiment are known in the prior art (US 20080108732 A1) to be effective as a superplasticizer in cementitious compositions. US 20080108732 A1 describes polycondensates based on an aromatic or heteroaromatic compound (A) having 5 to 10 C atoms or heteroatoms, having at least one oxyethylene or oxypropylene radical, and an aldehyde (C) selected from the group consisting of formaldehyde, glyoxylic acid and benzaldehyde or mixtures thereof, which result in an improved plasticizing effect of inorganic binder suspensions compared with the conventionally used polycondensates and maintain this effect over a longer period ("slump retention"). In a particular embodiment, these may also be phosphated polycondensates.

Typically the polycondensate contains (I) at least one structural unit consisting of an aromatic or heteroaromatic moiety bearing a polyether side chain, preferably a polyalkylene glycol side chain, more preferably a polyethylene glycol side chain. The structural unit consisting of an aromatic or heteroaromatic moiety bearing a polyether side chain, preferably a polyethylene glycol side chain is selected preferably from the group of alkoxylated, preferably ethoxylated, hydroxy-functionalized aromates or heteroaromates (for example the aromates can be selected from phenoxyethanol, phenoxypropanol, 2-alkoxyphenoxyethanols, 4-alkoxyphenoxyethanols, 2-alkylphenoxyethanols, 4-alkylphenoxyethanols) and/or alkoxylated, preferably ethoxylated, amino-functionalized aromates or heteroaromates (for example the aromates can be selected from N,N-(Dihydroxyethyl)aniline, N,-(Hydroxyethyl)aniline, N,N-(Dihydroxypropyl)aniline, N,-(Hydroxypropyl)aniline). More preferable are alkoxylated phenol derivatives (for example phenoxyethanol or phenoxypropanol), most preferable are alkoxylated, especially ethoxylated phenol derivatives featuring weight average molecular weights between 300 g/mol and 10,000 g/mol (for example polyethylenglycol monophenylethers).

Typically the polycondensate contains (II) at least one phosphated structural unit consisting of an aromatic or heteroaromatic moiety bearing at least one phosphoric acid ester group and/or a salt of the phosphoric acid ester group, which is selected preferably from the group of alkoxylated hydroxy-functionalized aromates or heteroaromates (for example phenoxyethanol phosphate, polyethylenglycol monophenylether phosphates) and/or alkoxylated amino-functionalized aromates or heteroaromates (for example N,N-(Dihydroxyethyl)aniline diphosphate, N,N-(Dihydroxyethyl)aniline phosphate, N,-(Hydroxypropyl)aniline phosphate), which bear at least one phosphoric acid ester group and/or a salt of the phosphoric acid ester group (e.g. by esterification with phosphoric acid and optional addition of bases). More preferable are alkoxylated phenols bearing at least one phosphoric acid ester group and/or a salt of the phosphoric acid ester group (for example polyethylenglycol monophenylether phosphates with less than 25 ethylene glycol units) and most preferable are the respective alkoxylated phenols featuring weight average molecular weights between 200 g/mol and 600 g/mol (for example phenoxyethanol phosphate, polyethylenglycol monophenylether phosphates with 2 to 10 ethyleneglycol units), the alkoxylated phenols bearing at least one phosphoric acid ester group and/or a salt of the phosphoric acid ester group (e.g. by esterification with phosphoric acid and optional addition of bases).

In another embodiment of the invention the process is characterized in that in the polycondensate the structural units (I) and (II) are represented by the following general formulae

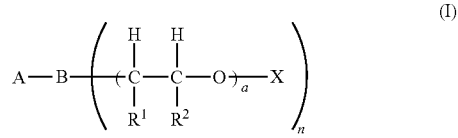

where

A are identical or different and are represented by a substituted or unsubstituted aromatic or heteroaromatic compound having 5 to 10 C atoms where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where
a are identical or different and are represented by an integer from 1 to 300
where
X are identical or different and are represented by a branched or straight-chain $C_1$- to $C_{10}$-alkyl radical, $C_5$- to $C_8$-cycloalkyl radical, aryl radical, heteroaryl radical or H, preferably H,

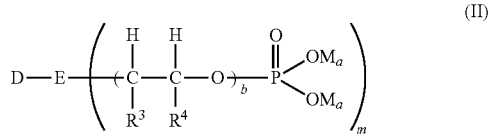

(II)

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H, a is 1 or in the case of alkaline earth metal ions ½.

The groups A and D in the general formulae (I) and (II) of the polycondensate are preferably represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, it being possible for A and D to be chosen independently of one another and also in each case to consist of a mixture of said compounds. The groups B and E, independently of one another, are preferably represented by O. The radicals $R^1$, $R^2$, $R^3$ and $R^4$ can be chosen independently of one another and are preferably represented by H, methyl, ethyl or phenyl, particularly preferably by H or methyl and especially preferably by H.

In general formula (I) a is preferably represented by an integer from 1 to 300, in particular 3 to 200 and particularly preferably 5 to 150 and b in general formula (II) by an integer from 1 to 300, preferably 1 to 50 and particularly preferably 1 to 10. The respective radicals, the length of which is defined by a and b, respectively, may consist here of uniform building blocks, but a mixture of different building blocks may also be expedient. Furthermore, the radicals of the general formulae (I) or (II), independently of one another, may each have the same chain length, a and b each being represented by a number. As a rule, however, it will be expedient if mixtures having different chain lengths are present in each case so that the radicals of the structural units in the polycondensate have different numerical values for a and independently for b.

Frequently, the phosphated polycondensate according to the invention has a weight average molecular weight of 5.000 g/mol to 200.000 g/mol, preferably 10.000 to 100.000 g/mol and particularly preferably 15.000 to 55.000 g/mol.

The phosphated polycondensate can be present also in form of its salts, as for example the sodium, potassium, organic ammonium, ammonium and/or calcium salt, preferably as the sodium and/or calcium salt.

Typically the molar ratio of the structural units (I):(II) is 1:10 to 10:1, preferably 1:8 to 1:1. It is advantageous to have a relatively high proportion of structural units (II) in the polycondensate because a relatively high negative charge of the polymers has a good influence on the stability of the suspensions.

In a preferred embodiment of the invention the polycondensate contains a further structural unit (III) which is represented by the following formula

(III)

where
Y, independently of one another, are identical or different and are represented by (I), (II), or further constituents of the polycondensate
where
$R^5$ are identical or different and are represented by H, $CH_3$, COOH or a substituted or unsubstituted aromatic or heteroaromatic compound having 5 to 10 C atoms, preferably H
where
$R^6$ are identical or different and are represented by H, $CH_3$, COOH or a substituted or unsubstituted aromatic or heteroaromatic compound having 5 to 10 C atoms, preferably H.

The polycondensates are typically prepared by a process in which (I) at least one structural unit consisting of an aromatic or heteroaromatic moiety bearing a polyether side chain (for example poly(ethyleneglycol)monophenyl ether) and (II) at least one structural unit consisting of an aromatic or heteroaromatic moiety bearing at least one phosphoric acid ester group and/or a salt of the phosphoric acid ester group (for example phenoxyethanol phosphoric acid ester) are reacted with (IIIa) a monomer having a keto group. Preferably the monomer having a keto group is represented by the general formula (IIIa),

(IIIa)

where
$R^7$ are identical or different and are represented by H, $CH_3$, COOH and/or a substituted or unsubstituted aromatic or heteroaromatic compound having 5 to 10 C atoms, preferably H,
where
$R^8$ are identical or different and are represented by H, $CH_3$, COON and/or a substituted or unsubstituted aromatic or heteroaromatic compound having 5 to 10 C atoms, preferably H.

Preferably the monomer having a keto group is selected from the group of ketones, preferably being an aldehyde, most preferably formaldehyde. Examples for chemicals according to general structure (IIIa) are formaldehyde, acetaldehyde, acetone, glyoxylic acid and/or benzaldehyde. Formaldehyde is preferable.

Typically $R^5$ and $R^6$ in structural unit (III), independently of one another, are identical or different and are represented by H, COOH and/or methyl. Most preferable is H.

In another preferred embodiment of the invention the molar ratio of the structural units [(I)+(II)]:(III) is 1:0.8 to 3 in the polycondensate.

Preferably the polycondensation is carried out in the presence of an acidic catalyst, this catalyst preferably being sulphuric acid, methanesulphonic acid, para-toluenesulphonic acid or mixtures thereof. The polycondensation and the phosphation are advantageously carried out at a temperature between 20 and 150° C. and a pressure between 1 and 10 bar. In particular, a temperature range between 80 and 130° C. has proved to be expedient. The duration of the reaction may be between 0.1 and 24 hours, depending on temperature, the chemical nature of the monomers used and the desired degree of crosslinking. Crosslinking can preferably occur if monosubstituted monomers of structural unit I and/or II are used because the condensation reaction can occur in the two ortho positions and the para position. Once the desired degree of polycondensation has been reached, which can also be determined, for example, by measurement of the viscosity of the reaction mixture, the reaction mixture is cooled.

The reaction mixture might be subjected to a thermal after treatment at a pH between 8 and 13 and a temperature between 60 and 130° C. after the end of the condensation and phosphation reaction. As a result of the thermal after treatment, which advantageously lasts for between 5 minutes and 5 hours, it is possible substantially to reduce the aldehyde content, in particular the formaldehyde content, in the reaction solution. Alternatively the reaction mixture can be subjected to a vacuum treatment or other methods known in the prior art to reduce the content of (form)aldehyde.

In order to obtain a better shelf life and better product properties, it is advantageous to treat the reaction solutions with basic compounds. It is therefore to be regarded as being preferred to react the reaction mixture after the end of the reaction with a basic sodium, potassium, ammonium or calcium compound. Sodium hydroxide, potassium hydroxide, ammonium hydroxide or calcium hydroxide has proved to be particularly expedient here, it being regarded as being preferred to neutralize the reaction mixture. However, other alkali metal and alkaline earth metal salts and salts of organic amine are suitable as salts of the phosphated polycondensates as well.

Mixed salts of the phosphated polycondensates can also be prepared by reaction of the polycondensates with at least two basic compounds.

The catalyst used can also be separated off. This can conveniently be done via the salt formed during the neutralization. If sulphuric acid is used as a catalyst and the reaction solution is treated with calcium hydroxide, the calcium sulphate formed can be separated off, for example, in a simple manner by filtration.

Furthermore, by adjusting the pH of the reaction solution to 1.0 to 4.0, in particular 1.5 to 2.0, the phosphated polycondensate can be separated from the aqueous salt solution by phase separation and can be isolated. The phosphated polycondensate can then be taken up in the desired amount of water. However, other methods known to the person skilled in the art, such as dialysis, ultrafiltration or the use of an ion exchanger, are also suitable for separating off the catalyst.

In a preferred embodiment, the water-soluble comb polymer suitable as a plasticizer for hydraulic binders is present as a copolymer which contains, on the main chain, side chains having ether functions and acid functions.

In a preferred embodiment, the water-soluble comb polymer suitable as a plasticizer for hydraulic binders is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth)acrylic acid).

In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidon, butadiene, vinyl proprionate, unsaturated hydrocarbons like for example ethylene, propylene and/or (iso)butylene. This listing is a non-exhaustive enumeration. Preferable are monomers with not more than one carbon double bond.

In a preferred embodiment of the invention the water-soluble comb-polymer suitable as plasticizer for hydraulic binders is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives.

Copolymers of this preferred embodiment are described in U.S. Pat. No. 5,158,996, the disclosure of which is incorporated into the present patent application.

Frequently, a structural unit is produced in the copolymer by incorporation of the acid monomer in the form polymerized units, which structural unit is in accordance with the general formulae (Ia), (Ib), (Ic) and/or (Id)

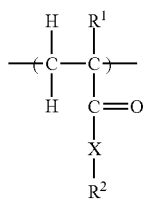
(Ia)

where
R$^1$ are identical or different and are represented by H and/or a non-branched chain or a branched C$_1$-C$_4$ alkyl group;
X are identical or different and are represented by NH—(C$_n$H$_{2n}$) where n=1, 2, 3 or 4 and/or O—(C$_n$H$_{2n}$) where n=1, 2, 3 or 4 and/or by a unit not present;
R$^2$ are identical or different and are represented by OH, SO$_3$H, PO$_3$H$_2$, O—PO$_3$H$_2$ and/or para-substituted C$_6$H$_4$—SO$_3$H, with the proviso that, if X is a unit not present, R$^2$ is represented by OH;

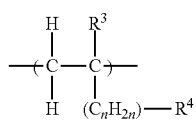
(Ib)

where
R$^3$ are identical or different and are represented by H and/or a non-branched chain or a branched C$_1$-C$_4$ alkyl group;
n=0, 1, 2, 3 or 4
R$^4$ are identical or different and are represented by SO$_3$H, PO$_3$H$_2$, O—PO$_3$H$_2$ and/or para-substituted C$_6$H$_4$—SO$_3$H;

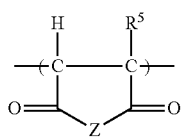
(Ic)

where
R$^5$ are identical or different and are represented by H and/or a non-branched chain or a branched C$_1$-C$_4$ alkyl group;
Z are identical or different and are represented by O and/or NH;

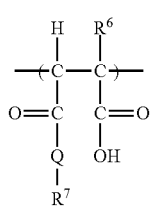
(Id)

where
R$^6$ are identical or different and are represented by H and/or a non-branched chain or a branched C$_1$-C$_4$ alkyl group;
Q are identical or different and are represented by NH and/or O;

R$^7$ are identical or different and are represented by H, (C$_n$H$_{2n}$)—SO$_3$H where n=0, 1, 2, 3 or 4, preferably 1, 2, 3 or 4, (C$_n$H$_{2n}$)—OH where n=0, 1, 2, 3 or 4, preferably 1, 2, 3 or 4; (C$_n$H$_{2n}$)—PO$_3$H$_2$ where n=0, 1, 2, 3 or 4, preferably 1, 2, 3 or 4, (C$_n$H$_{2n}$)—OPO$_3$H$_2$ where n=0, 1, 2, 3 or 4, preferably 1, 2, 3 or 4, (C$_6$H$_4$)—SO$_3$H, (C$_6$H$_4$)—PO$_3$H$_2$, (C$_6$H$_4$)—OPO$_3$H$_2$ and/or (C$_m$H$_{2m}$)$_e$—O-(A'O)$_\alpha$—R$^9$ where m=0, 1, 2, 3 or 4, preferably 1, 2, 3 or 4, e=0, 1, 2, 3 or 4, preferably 1, 2, 3 or 4, A'=C$_x$H$_{2x'}$ where x'=2, 3, 4 or 5 and/or CH$_2$C(C$_6$H$_5$)H—, α=an integer from 1 to 350 where R$^9$ are identical or different and are represented by a non-branched chain or a branched C$_1$-C$_4$ alkyl group.

Typically, a structural unit is produced in the copolymer by incorporation of the polyether macromonomer in the form of polymerized units, which structural unit is in accordance with the general formulae (IIa), (IIb) and/or (IIc)

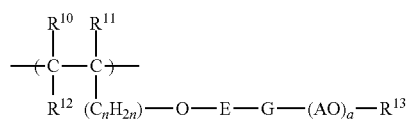
(IIa)

where
R$^{10}$, R$^{11}$ and R$^{12}$ are in each case identical or different and, independently of one another, are represented by H and/or a non-branched chain or a branched C$_1$-C$_4$ alkyl group;
E are identical or different and are represented by a non-branched chain or branched C$_1$-C$_6$ alkylene group, preferably C$_2$-C$_6$ alkylene group, a cyclohexylene group, CH$_2$—C$_6$H$_{10}$, ortho-, meta- or para-substituted C$_6$H$_4$ and/or a unit not present;
G are identical or different and are represented by O, NH and/or CO—NH, with the proviso that, if E is a unit not present, G is also present as a unit not present;
A are identical or different and are represented by C$_x$H$_{2x}$ where x=2, 3, 4 and/or 5 (preferably x=2) and/or CH$_2$CH(C$_6$H$_5$);
n are identical or different and are represented by 0, 1, 2, 3, 4 and/or 5;
a are identical or different and are represented by an integer from 2 to 350 (preferably 10-200);
R$^{13}$ are identical or different and are represented by H, a non-branched chain or a branched C$_1$-C$_4$ alkyl group, CO—NH$_2$, and/or COCH$_3$;

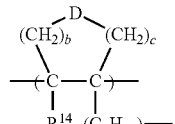
(IIb)

where
R$^{14}$ are identical or different and are represented by H and/or a non-branched chain or branched C$_1$-C$_4$ alkyl group;
E are identical or different and are represented by a non-branched chain or branched C$_1$-C$_6$ alkylene group, preferably a C$_1$-C$_6$ alkylene group, a cyclohexylene group, CH$_2$—C$_6$H$_{10}$, ortho-, meta- or para-substituted C$_6$H$_4$ and/or by a unit not present;

G are identical or different and are represented by a unit not present, O, NH and/or CO—NH, with the proviso that, if E is a unit not present, G is also present as a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5 a are identical or different and are represented by an integer from 2 to 350;

D are identical or different and are represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O, b=0, 1, 2 or 3, c=0, 1, 2 or 3, where b+c=2 or 3;

$R^{15}$ are identical or different and are represented by H, a non-branched chain or branched $C_1$-$C_4$ alkyl group, CO—$NH_2$, and/or $COCH_3$;

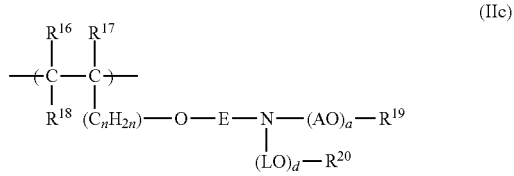

(IIc)

where $R^{16}$, $R^{17}$ and $R^{18}$ are in each case identical or different and, independently of one another, are represented by H and/or a non-branched chain or branched $C_1$-$C_4$ alkyl group;

E are identical or different and are represented by a non-branched chain or a branched $C_1$-$C_6$ alkylene group, preferably a $C_2$-$C_8$ alkylene group, a cyclohexylene group, $CH_2$—$C_6H_{10}$, ortho-, meta- or para-substituted $C_6H_4$ and/or by a unit not present; preferably E is not a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 2 to 350;

d are identical or different and are represented by an integer from 1 to 350;

$R^{19}$ are identical or different and are represented by H and/or a non-branched chain or a branched $C_1$-$C_4$ alkyl group, $R^{20}$ are identical or different and are represented by H and/or a non-branched chain $C_1$-$C_4$ alkyl group.

In a further embodiment of the invention a structural unit is produced in the copolymer by incorporation of the polyether macromonomer in the form of polymerized units, which structural unit is in accordance with the general formula (IId)

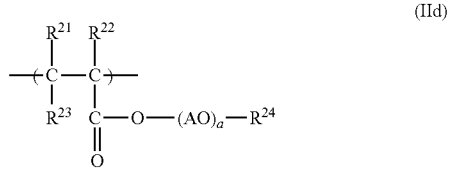

(IId)

where $R^{21}$, $R^{22}$ and $R^{23}$ are in each case identical or different and, independently of one another, are represented by H and/or a non-branched chain or branched $C_1$-$C_4$ alkyl group;

A are identical or different and are represented by $C_xH_{2x}$ where x=2, 3, 4 and/or 5 and/or $CH_2CH(C_6H_5)$;

a are identical or different and are represented by an integer from 2 to 350;

$R^{24}$ are identical or different and are represented by H and/or a non-branched chain or a branched $C_1$-$C_4$ alkyl group, preferably a $C_1$-$C_4$ alkyl group.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

Usually, a suspension containing the calcium silicate hydrate (C—S—H) in finely dispersed form is obtained. This suspension effectively accelerates the hardening process of hydraulic binders.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochlorite, calcium iodate, calcium iodide, calcium lactate, calcium nitrite, calcium oxalate, calcium phosphate, calcium propionate, calcium silicate, calcium stearate, calcium sulfate, calcium sulphate hemihydrate, calcium sulphate dihydrate, calcium sulphide, calcium tartrate and/or calcium aluminate, tricalcium silicate and/or dicalcium silicate.

The water-soluble calcium compound is preferably present as calcium chloride, calcium nitrate and/or calcium formate.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass.

In principle, a calcium silicate (provided that it is soluble) may be used both as a silicate source and as a calcium source. In many cases, however, this is not preferred. As a rule, species of different types are used as the water-soluble silicate compound and as the water-soluble calcium compound.

The sprayable hydraulic binder composition prepared by the method of the invention does not only improve the setting and/or early strength development in hydraulic binder compositions, but also makes possible to reduce the cement content and achieve same or better early strength development.

In a preferred embodiment of the present invention the hydraulic binder is clinker, gypsum, calcium sulfate, bassanite (calcium sulphate hemihydrate), anhydrite (anhydrous calcium sulphate), lime, a latent hydraulic binder (e.g. fly ash, blast furnace slag or pozzolans), and mixtures thereof, preferably Portland cement.

Cement is typically used in the construction industry as finely ground hydraulic binder for making concrete, mortar, concrete stones and finished parts.

Portland cement is a basic ingredient of concrete, mortar and most non-speciality grout. The most common use for Portland cement is in the production of concrete. Concrete is a composite material mainly consisting of aggregate (gravel and sand), cement, and water. As a construction material, concrete can be cast in almost any shape desired, and once hardened, can become a structural (load bearing) element. Portland cement may be a gray or white one.

In a preferred embodiment, the aggregates are selected from the group consisting of sand, organic and/or inorganic granulates, gravel, preferably with a size distribution from 0-16 mm, preferably 0-8 mm.

In a preferred embodiment the set accelerator contains as main components sulfate, aluminium in oxidation state +3 or mixtures thereof.

U.S. Pat. No. 5,340,385 discloses that several chemical set accelerators are well-known. Included and comprised by the present invention are alkali hydroxides, silicates, fluorosilicates, calcium formate, sodium chloride, calcium chloride, calcium nitrate and calcium nitrite. Additionally, the set accelerating effect on cement is increased by mixing the amorphous aluminum hydroxide with water-soluble sulfates, nitrates and formates of the alkaline earth and transition metals.

In a preferred embodiment the set accelerator contains sulfate in amounts between 15 and 40%, by weight, referred to the weight of said accelerator, and/or aluminum in oxidation state 3 in amounts between 3 and 10% by weight, referred to the weight of said accelerator.

In a preferred embodiment of the invention the calcium silicate hydrate containing component is a calcium silicate hydrate itself or a calcium silicate hydrate containing mixture.

In a further preferred embodiment the calcium silicate hydrate is used with a calcium/silicium (Ca/Si)-molar ratio of 0.5 to 2.0, preferably 0.7 to 1.9, more preferably 1.6 to 1.8.

In a further preferred embodiment the calcium silicate hydrate (C—S—H) containing component is a suspension or a solid, preferably a suspension.

In a preferred embodiment, the hydraulic binder is used in amounts from 300 to 600 kg/m³, preferably 380 to 500 kg/m', more preferably 350 to 450 kg/m³.

In a further preferred embodiment the calcium silicate hydrate (C—S—H) containing component is added to the hydraulic binder in the cement plant, in the ready-mix plant, to the truck mixer, to the convey pump and/or at the spray nozzle, more preferably to the batching water.

In a further embodiment the calcium silicate hydrate (C—S—H) containing component is obtainable by reaction of a water-soluble calcium compound with a water-soluble silicate compound, the reaction of the water-soluble calcium compound with the water-soluble silicate compound being preferably carried out in the presence of an aqueous solution which contains at least one water-soluble polymer, preferably a plasticizer or a superplasticizer, most preferably a comb polymer as dispersant preferably suitable as a plasticizer for hydraulic binders according to EN 934-2. It can contain any other type of admixture such as retarders, air entrainers, or combinations thereof.

In the context of the present invention, the term "comb polymer" is to be understood as polymers which have relatively long side chains (having a molecular weight of in each case at least 200 g/mol, particularly preferably at least 400 g/mol) on a linear main chain at more or less regular intervals. The lengths of these side chains are frequently approximately equal but may also differ greatly from one another (for example when polyether macromonomers having side chains of different lengths are incorporated in the form of polymerized units).

A further preferred embodiment of this invention is a sprayable hydraulic binder containing composition which can be prepared by a process.

The invention furthermore comprises a sprayable hydraulic binder containing composition additionally comprising a superplasticizer, preferably a polycarboxylate ether and more preferably a dispersion thereof.

Plasticizers or dispersants are additives that increase the plasticity or fluidity of the material to which they are added, these include plastics, cement, concrete, wallboard and clay bodies. Plasticizers for concrete fluidify the mix before it hardens, increasing its workability or reducing water, and are usually not intended to affect the properties of the final product after it hardens. Additionally, concrete superplasticizers are polycarboxylate ether polymer-based composite admixtures and/or sulfonate melamine formaldehyde condensate, sulfonate naphthalene formaldehyde condensate, or acrylic polymer families. It has the advantageous effect of a slump retention ability. It is specially adapted to the production of high durability concrete, selfcompacting-concrete, high workability-retaining concrete, and also concrete with good appearance requirement.

Finally, the invention comprises a method of use of the composition for the coating of substrates with sprayed concrete or sprayed mortar.

By spraying the coating under the pillar (over head) its load bearing capability is increased. The coating may also be applied to reduce or prevent weathering, that is the erosion of freshly exposed rock surfaces by air in the tunnel or mine, for the suppression of radon gas in an uranium mine or for stabilizing embankments for example in a quarry, for stabilizing roofs of tunnels or the like.

According to this invention the terms "concrete" and "mortar", respectively "sprayed concrete" and "sprayed mortar", may also comprise other cementitious materials. For example cement based grouts for mining and cementitious mortars for fire protection of concrete.

The invention is to be described in more detail below with reference to working examples.

The following examples illustrate this invention.

EXAMPLE 1

Influence on the Early Hydration Kinetics of the Combination of Calcium Silicate Hydrate (C—S—H) and Alkali-Free ($Na_2O_{eq}$<1% by Weight) Set Accelerators (FIG. 1)

This example shows the effect of the inventive combination of calcium silicate hydrate (C—S—H) and a set accelerator (alkali-free, $Na_2O_{eq}$<1.0% by weight, according to EN 480-12) on the early hydration kinetics of Portland cement paste.

To measure the hydration kinetics, about 2 g of cement was weighted in a glass ampoule which is tightly sealed immediately after mixing with the water or admixture-water solution (the admixtures, if required, were previously dissolved in the water) and then placed into an isothermal calorimeter TAM Air. The measurements were performed at the temperature of 20° C.

Said cement paste mixtures are composed as follows:

TABLE 1

| Component (in g) | M 1.1 | M 1.2 | M 1.3 | M 1.4 | M 1.5 | M 1.6 |
|---|---|---|---|---|---|---|
| CEM I 42.5N Heidelberg Anläggning | 2.000 | 2.000 | 2.000 | 2.000 | 2.000 | 2.000 |
| Water | 0.900 | 0.812 | 0.900 | 0.900 | 0.812 | 0.812 |

TABLE 1-continued

| Component (in g) | M 1.1 | M 1.2 | M 1.3 | M 1.4 | M 1.5 | M 1.6 |
|---|---|---|---|---|---|---|
| Calcium silicate hydrate suspension | | 0.112 | | | 0.112 | 0.112 |
| Alkali-free set accelerator 1 | | 0.160 | | | 0.160 | |
| Alkali-free set accelerator 2 | | | 0.180 | | | 0.180 |

Both alkali-free set accelerator 1 and 2 are based on aluminum sulfate.

The results are shown in FIG. 1. The lines are isothermal calorimetry data, and the symbols identify individual data sets. The addition of calcium silicate hydrate (C—S—H) has a significant accelerating effect on the second ($C_3S$ hydration) peak (the maximum rate is increased and the time to reach the rate peak decreased), whereas the addition of set accelerator has a significant accelerating effect on the first (dissolution) peak. The combination of both shows acceleration of both hydration peaks.

EXAMPLE 2

Influence on the Early Hydration Kinetics of the Combination of Calcium Silicate Hydrate (C—S—H) and Alkali-Rich ($Na_2O_{eq}$>1% by Weight According to EN 480-12) Set Accelerators (FIG. 2)

This example shows the effect of the inventive combination of calcium silicate hydrate (C—S—H) and an alkali-rich ($Na_2O$>1.0% by weight according to EN 480-12) set accelerator on the early hydration kinetics of Portland cement paste. A cement paste is prepared and the hydration kinetics measured as described in example 1.

Said cement paste mixtures are composed as follows:

TABLE 2

| Component (in g) | M 2.1 | M 2.2 | M 2.3 | M 2.4 | M 2.5 | M 2.6 |
|---|---|---|---|---|---|---|
| CEM I 42.5N Heidelberg Anläggning | 2.000 | 2.000 | 2.000 | 2.000 | 2.000 | 2.000 |
| Water | 0.900 | 0.812 | 0.900 | 0.900 | 0.812 | 0.812 |
| Calcium silicate hydrate suspension | | 0.112 | | | 0.112 | 0.112 |
| Set accelerator 3 | | | 0.180 | | 0.180 | |
| Set accelerator 4 | | | | 0.140 | | 0.140 |

Set accelerator 3 is based on sodium silicate whereas set accelerator 4 is based on sodium aluminate.

The results are shown in FIG. 2. The lines are isothermal calorimetry data, and the symbols identify individual data sets. As in example 1, the addition of calcium silicate hydrate (C—S—H) has a significant accelerating effect on the second (C3S hydration) peak (the maximum rate is increased and the time to reach the rate peak decreased), whereas the addition of set accelerator has a significant accelerating effect on the first (dissolution) peak. The combination of both shows acceleration of both hydration peaks.

EXAMPLE 3

Influence of the Inventive Combination on the Early Strength Development of a Portland Cement Type I (FIG. 3)

In the example 3 the effect of an alkali-free set accelerator on the early strength development of a Portland cement Type I is compared with the effect of the inventive combination (calcium silicate hydrate (C—S—H)+set accelerator). Mortars prepared according to the European Norm EN 196-1 were chosen as mixtures for examination. Said mixtures are composed as follows:

TABLE 3

| Component (in g) | M 3.1 | M 3.2 |
|---|---|---|
| CEM I 42.5N Heidelberg Anläggning | 450 | 450 |
| Norm sand En 196 | 1350 | 1350 |
| Water | 202.5 | 177.5 |
| Superplasticizer High range | 0.9 | 0.45 |
| Calcium silicate hydrate suspension | | 32.0 |
| Alkali-free set accelerator | 49.5 | 40.5 |

The mortar samples were examined with a Penetrometer of the company LBG, which measures and records a continuous gradual increase of the consistency of the mixtures.

The positive influence of the combination of calcium silicate hydrate (C—S—H) and set accelerator on the early strength development is obvious and can be seen in FIG. 3. The addition of calcium silicate hydrate (C—S—H) improves the performance of the conventional set accelerator with this Portland cement Type I by a factor of 2 within 1-6 hours, at 2% by cement weight lower set accelerator dosage.

EXAMPLE 4

Influence of the Inventive Combination on the Early Strength Development of a Portland Cement Type II (FIG. 4)

In the example 4 the effect of an alkali-free set accelerator on the early strength development of a Portland cement Type II is compared with the effect of the inventive combination (calcium silicate hydrate (C—S—H)+set accelerator). Mortar mixtures are prepared and examined as described in example 3. Said mixtures are composed as follows:

TABLE 4

| Component (in g) | M 4.1 | M 4.2 |
|---|---|---|
| CEM II/A-V 42.5R Norcem | 450 | 450 |
| Norm sand EN 196 | 1350 | 1350 |
| Water | 202.5 | 177.5 |
| Superplasticizer High range | 0.9 | 0.45 |
| Calcium silicate hydrate suspension | | 32.0 |
| Alkali-free set accelerator | 49.5 | 40.5 |

The positive influence of the inventive combination on the early strength development of a Portland cement type II is obvious and is shown in FIG. 4. The addition of calcium silicate hydrate (C—S—H) improves the performance of the conventional set accelerator within 1-6 hours by a factor of 1.5 at 2% by cement weight lower dosage of set accelerator.

EXAMPLE 5

Influence of the Inventive Combination on the Early Strength Development of a Portland Cement Type II at Different Dosages of Calcium Silicate Hydrate (C—S—H) (FIG. 5)

In the example 5 the effect on the development of the early strength of Portland cement type I of the inventive combination at different calcium silicate hydrate (C—S—H) dosages is shown. Mortar mixtures are prepared and examined as described in example 3. Said mixtures are composed as follows:

TABLE 5

| Component (in g) | M 5.1 | M 5.2 | M 5.3 | M 5.4 |
|---|---|---|---|---|
| CEM II/A-LL 42.5 Holcim Fluvio ®4 | 450 | 450 | 450 | 450 |
| Norm sand EN 196 | 1350 | 1350 | 1350 | 1350 |
| Water | 202.5 | 198.3 | 190.0 | 177.5 |
| Superplasticizer High range | 0.9 | 0.45 | 0.45 | 0.45 |
| Calcium silicate suspension | | 5.34 | 16.0 | 32.0 |
| Alkali-free set accelerator | 36.0 | 36.0 | 36.0 | 36.0 |

By increasing the calcium silicate hydrate (C—S—H) component dosage a proportional improvement on the early strength is shown in FIG. 5.

EXAMPLE 6

Influence of the Inventive Combination on the Early Strength Development of a Portland Cement Type II at Different Temperatures (FIG. 6)

In the example 6 the effect on the development of the early strength of Portland cement type II of the inventive combination at different temperatures is shown. Mortar mixtures are prepared and examined as described in example 3. Said mixtures are composed as follows:

TABLE 6

| Component (in g) | M 6.1 | M 6.2 | M 6.3 |
|---|---|---|---|
| CEM II/A-LL 42.5 Holcim Fluvio ®4 | 450 | 450 | 450 |
| Norm sand EN 196 | 1350 | 1350 | 1350 |
| Water | 202.5 | 202.5 | 177.5 |
| Superplasticizer High range | 0.9 | 0.9 | 0.45 |
| Calcium silicate hydrate suspension | | | 32.0 |
| Alkali-free set accelerator | 36.0 | 36.0 | 36.0 |
| Temperature during experiments (° C.) | 20 | 20 | 10 |

As shown in FIG. 6, the calcium silicate hydrate (C—S—H) addition to an accelerated mortar can compensate the lower strength development at low temperatures within the first hours of hydration. The combination of calcium silicate hydrate (C—S—H) and set accelerator at 10° C. and the set accelerator alone at 20° C. have a comparable strength development in the first two hours.

EXAMPLE 7

Effect of the Inventive Combination on Setting and Compressive Strength of a Portland Cement Type II when Adding the Calcium Silicate Hydrate (C—S—H) Component in Powder or Suspension Form (Table 7b)

In the example 7 the effect of the inventive combination on the setting time and on the compressive strength of a Portland cement type I when the calcium silicate hydrate (C—S—H) component is added as powder is compared with the addition of calcium silicate hydrate (C—S—H) as a suspension. Mortar mixtures are prepared and examined according to EN 196 1-3. Said mixtures are composed as follows:

TABLE 7a

| | M 7.1 | M 7.2 | M 7.3 |
|---|---|---|---|
| Composition (g) | | | |
| CEM II/A-V42.5 R Norcem | 450.00 | 450.00 | 450.00 |
| Calcium silicate hydrate powder | | 7.00 | |
| Calcium silicate hydrate suspension | | | 25.30 |
| sand norm EN 196 | 1350.00 | 1350.00 | 1350.00 |
| water | 202.50 | 202.50 | 182.60 |
| High range superplasticizer | 0.90 | 0.90 | 0.45 |
| Alkali-free set accelerator | 36.00 | 36.00 | 36.00 |
| Composition (% bcw) | | | |
| Water/cement | 0.45 | 0.45 | 0.45 |
| High range superplasticizer | 0.20 | 0.20 | 0.10 |
| Calcium silicate hydrate active content | | 0.60 | 0.60 |
| Alkali-free set accelerator | 8.00 | 8.00 | 8.00 |

The addition of calcium silicate hydrate (C—S—H) powder shows a comparable improvement of the set accelerator performance as the addition of calcium silicate hydrate (C—S—H) in suspension form can bee seen in Table 7b.

TABLE 7b

| | M 7.1 | M 7.2 | M 7.3 |
|---|---|---|---|
| Initial set (min:s) | 02:30 | 02:30 | 02:00 |
| Final set (min:s) | 13:30 | 14:30 | 13:00 |
| Compressive strength 6 h (N/mm$^2$) | 2.9 | 4.6 | 4.5 |
| Compressive strength 1 d (N/mm$^2$) | 18.7 | 22.3 | 22.4 |
| Compressive strength 7 d (N/mm$^2$) | 34 | 38.9 | 33.7 |

EXAMPLE 8

Influence of the Inventive Combination on the Sprayed Concrete Early Compressive Strength Development at Different Dosages of Calcium Silicate Hydrate (C—S—H) (Table 8b)

Sprayed concrete tests were performed with the calcium silicate hydrate (C—S—H) and set accelerator combination according to the invention and the comparative examples with regard to the compressive strength development according to EFNARC European Specification for Sprayed Concrete 1999. Said concrete mixtures are composed as follows:

TABLE 8a

| | Composition | | M 8.1 | M 8.2 | M 8.3 |
|---|---|---|---|---|---|
| CEMENT | CEM II/A-LL 42.5 Holcim Fluvio ®4 | [kg] | 420 | 420 | 420 |
| SAND TYPE A | 0-4 mm | [kg] | 1246 | 1246 | 1246 |
| SAND TYPE B | 4-8 mm | [kg] | 534 | 534 | 534 |
| ADDITIVE | High range superplasticizer | [% bcw] | 1.2 | 1.2 | 1.2 |
| ADDITIVE | Calcium silicate hydrate suspension | [% bcw]* | 0.0 | 0.2 | 0.4 |
| ACCELERATOR | Alkali free set accelerator | [% bcw] | 8 | 8 | 8 |
| Water/Cement Ratio | | | 0.45 | 0.43 | 0.44 |

*percentage based on active substance

The results of the sprayed concrete tests with the inventive combination show a strong improvement on the early strength development as can be seen in Table 8b.

TABLE 8b

|  |  | M 8.1 | M 8.2 | M 8.3 |
|---|---|---|---|---|
| STRENGTH AFTER 3 min | [N/mm$^2$] | 0.09 | 0.10 | 0.12 |
| STRENGTH AFTER 6 min | [N/mm$^2$] | 0.14 | 0.17 | 0.14 |
| STRENGTH AFTER 15 min | [N/mm$^2$] | 0.21 | 0.27 | 0.26 |
| STRENGTH AFTER 30 min | [N/mm$^2$] | 0.32 | 0.45 | 0.43 |
| STRENGTH AFTER 1 h | [N/mm$^2$] | 0.63 | 0.70 | 0.66 |
| STRENGTH AFTER 2 h | [N/mm$^2$] | 2.44 | 3.37 | 4.56 |
| STRENGTH AFTER 4 h | [N/mm$^2$] | 4.32 | 5.57 | 7.53 |
| STRENGTH AFTER 6 h | [N/mm$^2$] | 7.73 | 8.67 | 12.52 |
| STRENGTH AFTER 24 h | [N/mm$^2$] | 27.34 | 27.46 | 33.11 |

DETAILED DESCRIPTION OF THE DRAWINGS

Figure 1:
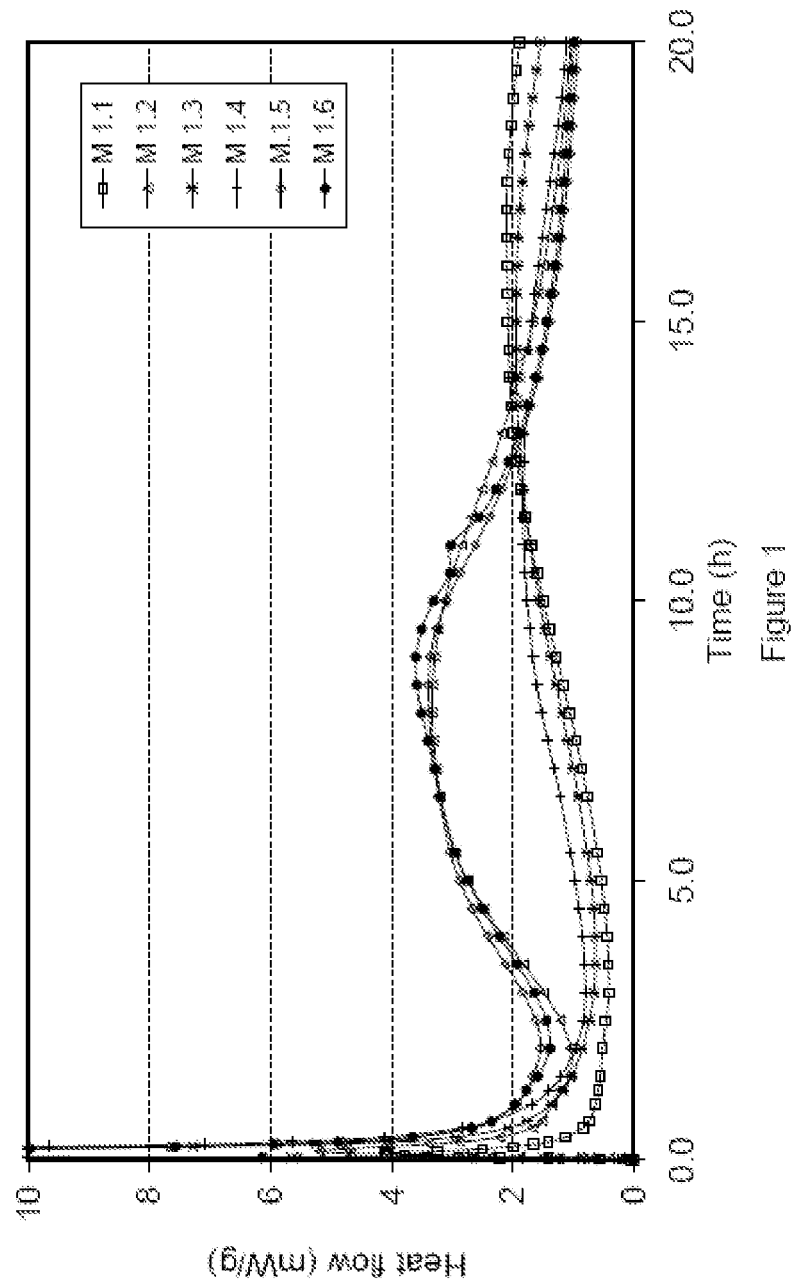
FIG. 1 shows the influence on the early hydration kinetics of the combination of calcium silicate hydrate (C—S—H) and alkali-free (Na$_2$O$_{eq}$<1% by weight) set accelerators.
Figure 2:
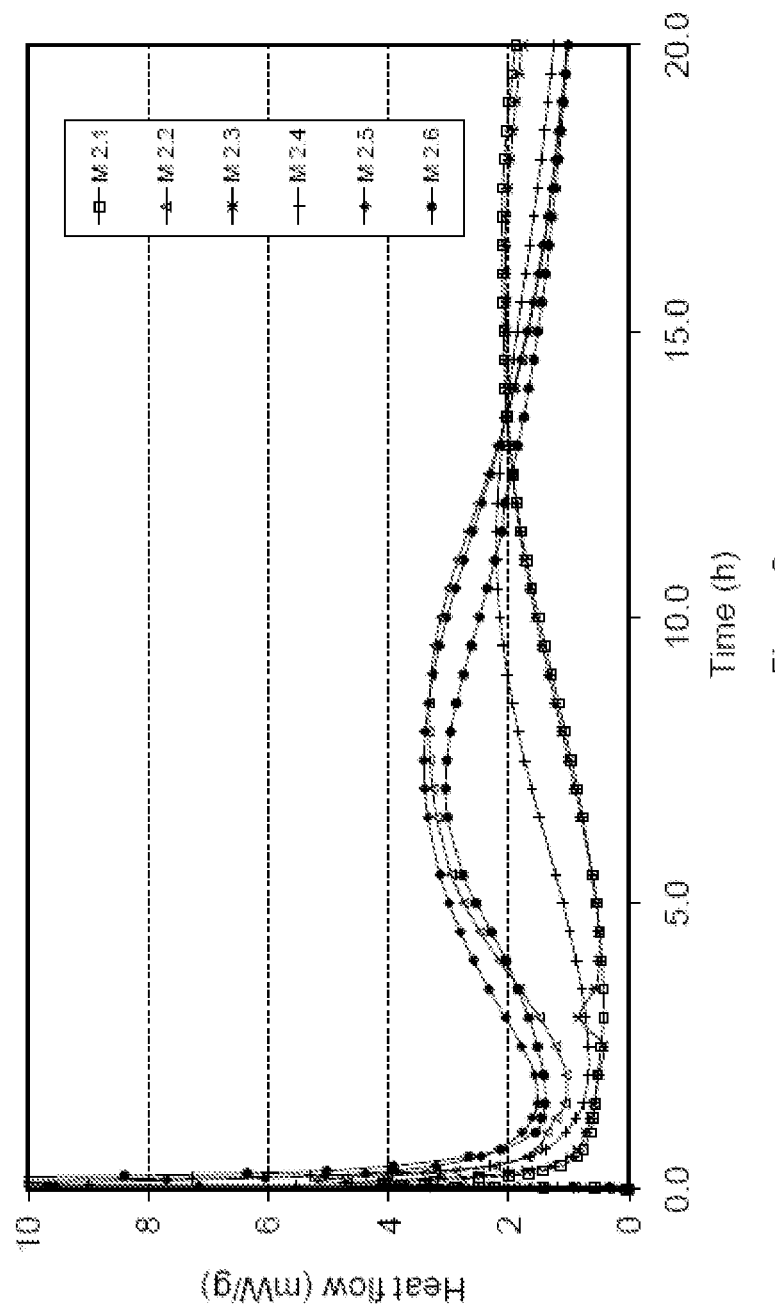
FIG. 2 shows the influence of the early hydration kinetics of the combination of calcium silicate hydrate (C—S—H) and alkali-rich (Na$_2$O$_{eq}$>1% by weight according to EN 480-12) set accelerators.
Figure 3:
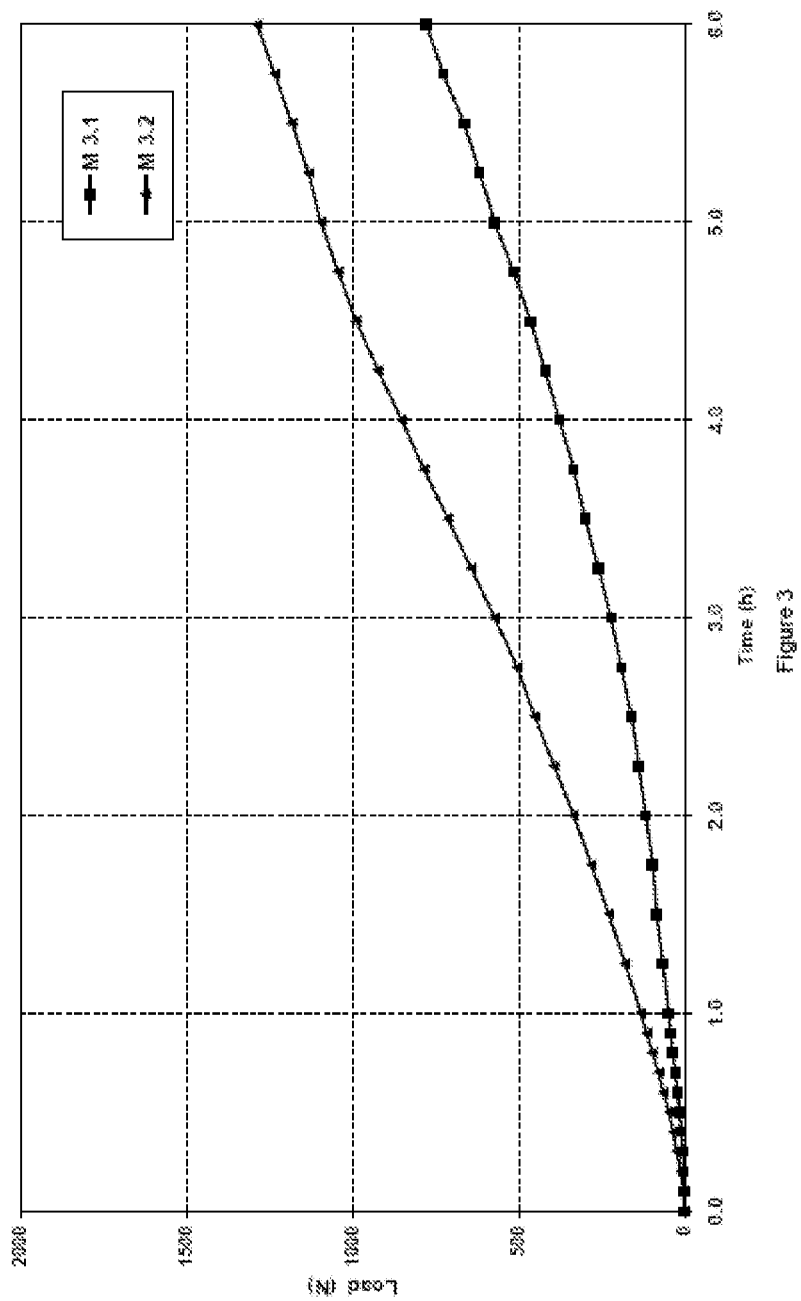
FIG. 3 shows the influence of the inventive combination on the early strength development of a Portland cement Type I.
Figure 4:
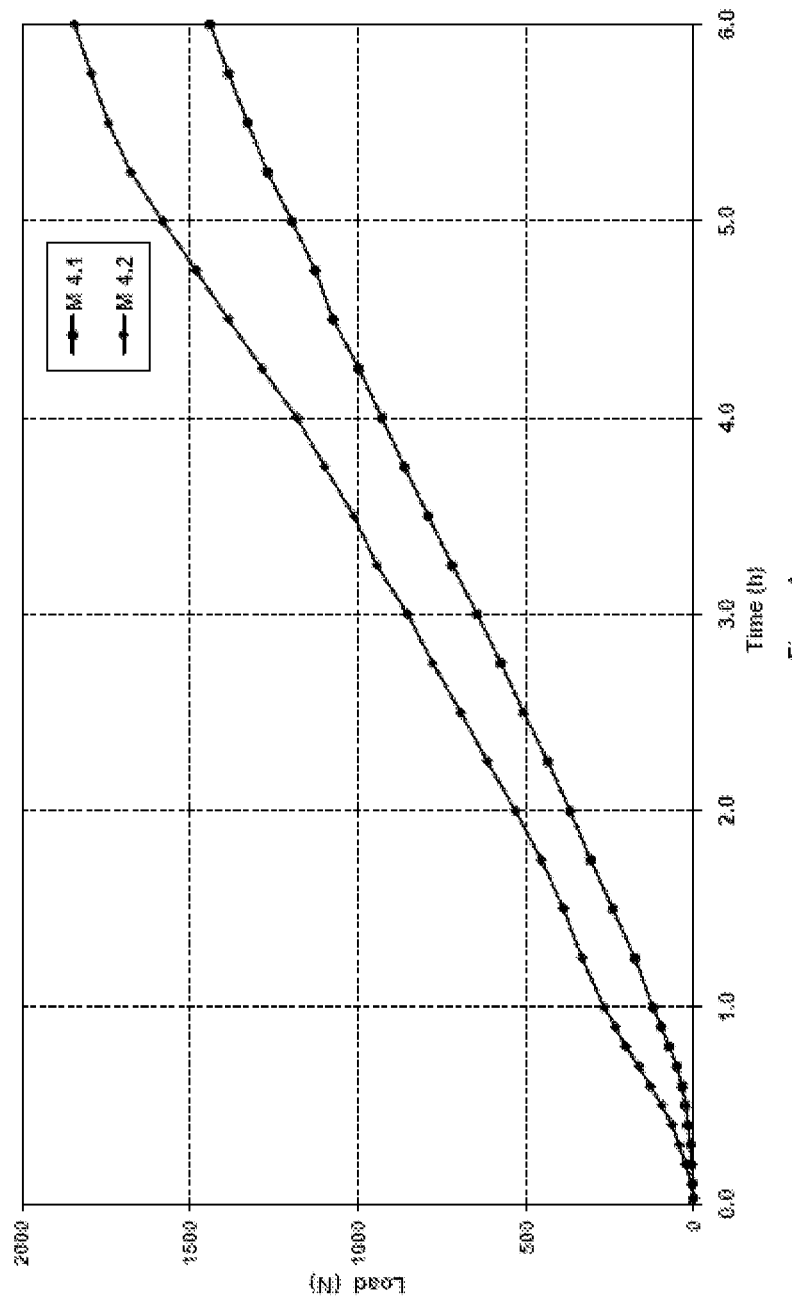
FIG. 4 shows the influence of the inventive combination on the early strength development of a Portland cement Type II.
Figure 5:
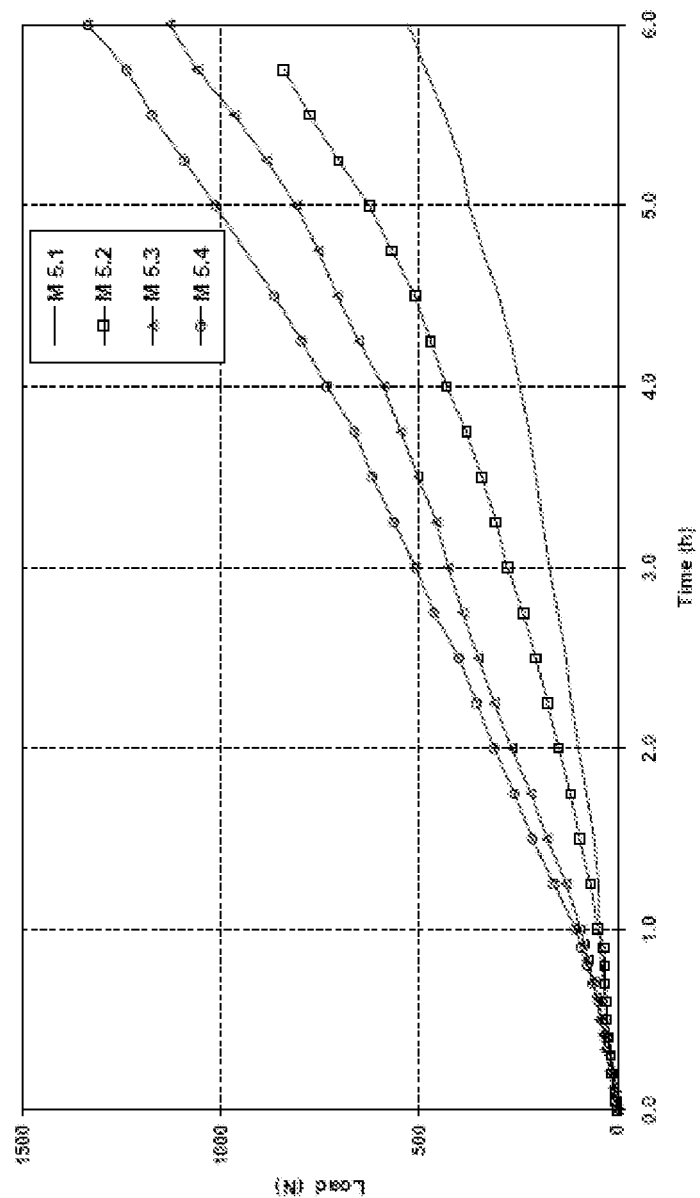
FIG. 5 shows the influence of the inventive combination on the early strength development of Portland cement Type II at different dosages of calcium silicate hydrate (C—S—H).
Figure 6:
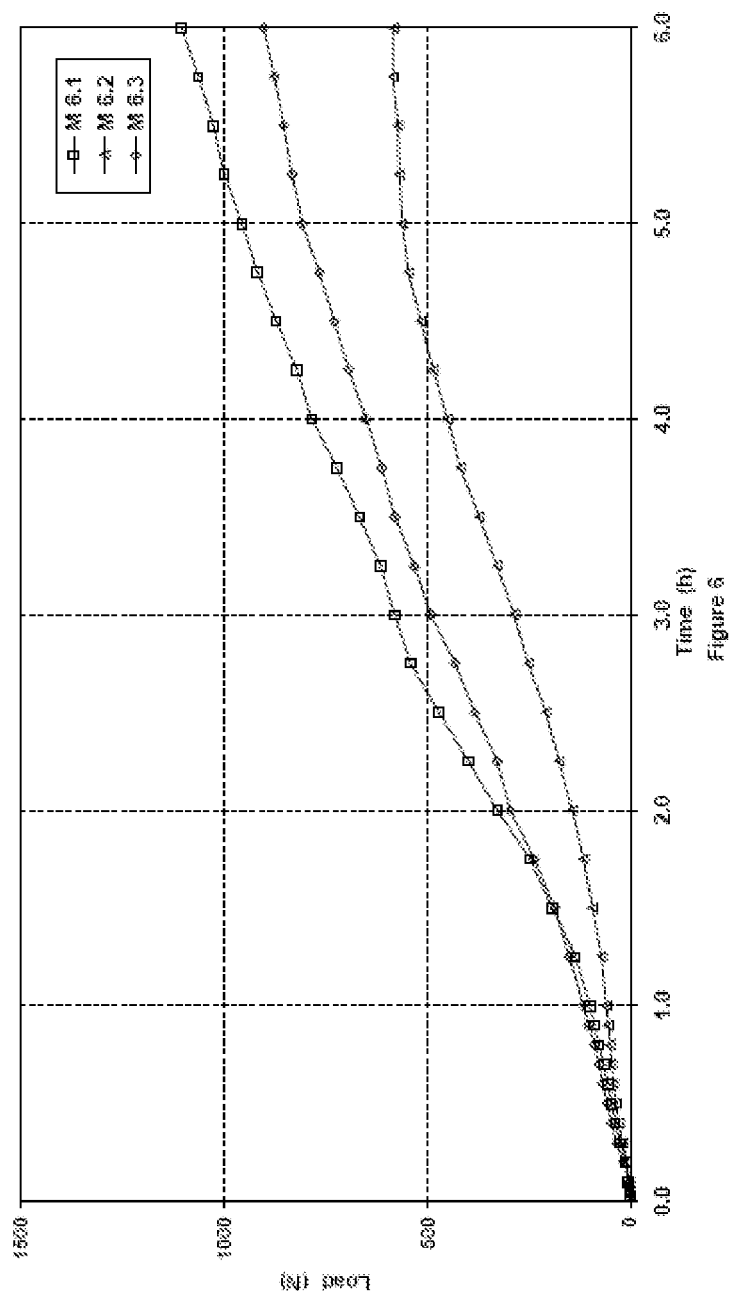
FIG. 6 shows the influence of the inventive combination of the early strength development of a Portland cement Type II at different temperatures.

The invention claimed is:

1. A process for the preparation of a sprayable hydraulic binder composition containing as main components water, aggregates, hydraulic binder, and set accelerator, and wherein a calcium silicate hydrate containing component obtained by reaction of a water-soluble calcium compound with a water-soluble silicate compound carried out in the presence of at least one organic water-soluble comb polymer, is added before and/or at a spray nozzle, wherein the calcium silicate hydrate containing component is added to the hydraulic binder as a calcium silicate hydrate suspension, as a calcium silicate hydrate powder, or with batching water.

2. The process according to claim 1, wherein the hydraulic binder is cement, gypsum, bassanite or anhydrite, lime, latent hydraulic binder, optionally fly ash, blast furnace slag or pozzolans, or mixtures thereof, optionally Portland cement.

3. The process according to claim 1 wherein the aggregates are selected from the group consisting of sand, granulates, and gravel, optionally with a size distribution from 0-16 mm, further optionally from 0-8 mm.

4. The process according to claim 1, wherein the set accelerator contains as main components sulfate, aluminium in an oxidation state of +3, or mixtures thereof.

5. The process according to claim 1, wherein the set accelerator contains sulfate in amounts between 15 and 40% by weight, referred to as the weight of said accelerator, and/or aluminum in an oxidation state of +3 in amounts between 3 and 10% by weight, referred to as the weight of said accelerator.

6. The process according to claim 1, wherein the calcium silicate hydrate containing component is calcium silicate hydrate or a calcium silicate hydrate containing mixture.

7. The process according to claim 1, wherein the calcium silicate hydrate is used with a calcium/silicium (Ca/Si)-molar ratio of 0.5 to 2.0.

8. The process according to claim 1, wherein the calcium silicate hydrate containing component is a liquid or in solid form, optionally a dispersion.

9. The process according to claim 1, wherein the hydraulic binder is used in amounts from 300 to 600 kg/m$^3$.

10. The process according to claim 1, wherein the calcium silicate hydrate containing component is added to the hydraulic binder in a cement plant, in a ready-mix plant, to a truck mixer, to a convey pump and/or to a spray nozzle.

11. The process according to claim 1, wherein the comb polymer as dispersant is suitable as a plasticizer for hydraulic binders according to EN 934-2.

12. The process according to claim 1, wherein the calcium silicate hydrate is used with a calcium/silicium (Ca/Si)-molar ratio of 0.7 to 1.9.

13. The process according to claim 1, wherein the calcium silicate hydrate is used with a calcium/silicium (Ca/Si)-molar ratio of 1.6 to 1.8.

14. The process according to claim 1, wherein the hydraulic binder is used in amounts from 380 to 500 kg/m$^3$.

15. The process according to claim 1, wherein the hydraulic binder is used in amounts from 350 to 450 kg/m$^3$.

* * * * *